United States Patent
Chen et al.

(10) Patent No.: US 8,230,776 B2
(45) Date of Patent: Jul. 31, 2012

(54) BREWING APPARATUS FOR PREPARING FOAM, FROTH OR CREMA UNDER LOW PRESSURE

(75) Inventors: Yee Mau Chen, Tai Po (HK); Raymond Wai Ming Wong, Tai Po (CN)

(73) Assignee: Electrical & Electronics Ltd., Tai Po (HK)

(*) Notice: Subject to any disclaimer, the term of this patent is extended or adjusted under 35 U.S.C. 154(b) by 587 days.

(21) Appl. No.: 12/407,578

(22) Filed: Mar. 19, 2009

(65) Prior Publication Data

US 2009/0173237 A1 Jul. 9, 2009

Related U.S. Application Data

(63) Continuation-in-part of application No. 11/494,334, filed on Jul. 26, 2006, now abandoned, and a continuation-in-part of application No. 11/317,999, filed on Dec. 22, 2005, now abandoned, and a continuation-in-part of application No. 11/195,843, filed on Aug. 2, 2005, now abandoned.

(51) Int. Cl.
*A47J 31/40* (2006.01)
*A47J 31/06* (2006.01)
(52) U.S. Cl. ............... 99/302 R; 99/295; 99/323.1
(58) Field of Classification Search ............ 99/302 R, 99/323, 307, 295, 323.1; 426/112, 115, 77, 426/82
See application file for complete search history.

(56) References Cited

U.S. PATENT DOCUMENTS

| | | | | |
|---|---|---|---|---|
| 4,429,623 A * | 2/1984 | Illy | | 99/295 |
| 4,882,982 A * | 11/1989 | Muttoni | | 99/295 |
| 5,127,318 A * | 7/1992 | Selby, III | | 99/295 |
| 5,150,645 A * | 9/1992 | Schiettecatte | | 99/295 |
| 5,307,734 A * | 5/1994 | Lussi et al. | | 99/287 |
| 5,628,902 A * | 5/1997 | Pytlik et al. | | 210/474 |
| 5,638,740 A * | 6/1997 | Cai | | 99/295 |
| 5,711,880 A * | 1/1998 | Friedrich et al. | | 210/498 |
| 5,913,962 A * | 6/1999 | Gasser et al. | | 99/293 |
| 6,044,754 A * | 4/2000 | Fuentes | | 99/295 |
| 6,379,564 B1 * | 4/2002 | Rohrbach et al. | | 210/765 |
| 6,481,338 B1 * | 11/2002 | Wai | | 99/302 R |
| 6,740,345 B2 * | 5/2004 | Cai | | 426/77 |
| 6,840,158 B2 * | 1/2005 | Cai | | 99/323.1 |
| 7,228,790 B2 * | 6/2007 | Chen et al. | | 99/302 R |
| 7,288,790 B2 * | 10/2007 | Tak et al. | | 257/59 |
| 7,591,217 B2 * | 9/2009 | Kodden et al. | | 99/302 R |
| 2005/0076783 A1 * | 4/2005 | Kodden et al. | | 99/275 |

* cited by examiner

*Primary Examiner* — William Pierce
(74) *Attorney, Agent, or Firm* — George A. Herbster

(57) ABSTRACT

The present invention pertains to a brewing filter apparatus capable of preparing foam, froth, or crema, particularly for coffee beverages, under low pressure. The apparatus can operate at pressures below 15 bar and as low as 1-3 bar. The apparatus comprises a mesh cover, coarse filter, fine filter, large 0-ring, coffee container, small 0-ring, and foam maker having two opposing holes. The holes have a diameter in the range of 0.3 to 1 mm. The crema is created by the turbulent contacting of two opposing jets of coffee, which enter the foam maker through the two opposing holes. To further increase agitation and the surface area for contact, a stainless steel wire mesh may be situated in the center of the foam maker directly in the path of and in between the opposing jets of coffee to facilitate the formation of more crema.

23 Claims, 5 Drawing Sheets

BREWING APPARATUS FOR PREPARING FOAM, FROTH OR CREMA UNDER LOW PRESSURE

This application is a continuation-in-part application of U.S. patent application Ser. No. 11/494,334 filed on Jul. 26, 2006 (now abandoned) and of U.S. patent application Ser. No. 11/317,999 filed Dec. 22, 2005 (now abandoned) and of U.S. patent application Ser. No. 11/195,843, filed Aug. 2, 2005 (now abandoned), the contents of which are incorporated in their entireties by reference into this application.

BACKGROUND OF THE INVENTION

Coffee beverages having a thick, foamy layer called "crema" are becoming increasingly popular among coffee drinkers and aficionados. Resembling the head that one might find in a glass of stout, crema is full of rich aroma and leaves a lingering flavor. Typically, coffee beverages, such as espresso, which are brewed under high pressure (15-19 bar) will have a layer of crema. The crema traps the fine aromatics and the light gaseous flavors of the coffee which can be quite pleasing to the palate. Like a blanket, the crema retains the pleasant aromas and flavors which would otherwise quickly escape from the coffee beverage.

Those of ordinary skill in the art currently use high-pressure brewing methods and apparatuses to prepare coffee beverages with the desired layer of foam, froth, or crema. It is widely-accepted by those in the art that high bar pressure is essential for making good crema. A pressure of 15-19 bar is considered the optimum range, although some skilled in the art state that 9-11 bar is sufficient if the coffee beans have been ground correctly. Unfortunately, it thus follows that regular coffee, which is currently brewed by conventional methods and apparatuses without high pressure, lacks the desired layer of crema. What is needed in response to this unmet need for a low-pressure solution is a brewing filter apparatus that can provide foam, froth, or crema, particularly for coffee beverages, using low pressures.

SUMMARY OF THE INVENTION

Therefore it is an object of this invention to provide a brewing filter apparatus capable of preparing foam, froth, or crema, particularly for coffee beverages, under low pressure of less than 15 bar and as low as the range of 1 to 3 bar.

Another object of this invention to provide a brewing filter apparatus comprising a filter, a beverage container, an O-ring and a foam maker with at least one hole for interacting with a mesh to provide foam, froth or crema, particularly an apparatus in which the filter is stainless steel and the O-ring is silicone rubber and designed to be used in conjunction with a general brew head assembly, such as found in a single-serve coffee machine.

Still another object of this invention to provide a brewing filter apparatus comprising a mesh cover, a coarse filter, a fine filter, a large 0-ring, a beverage container, a small O-ring, and a foam maker with at least one hole for interacting with a mesh to provide foam, froth or crema, particularly an apparatus in which the mesh cover is particularly beneficial in retaining ground coffee on the coarse filter and can be used optionally when using coffee pods and in which the mesh cover may be affixed to the brewing apparatus by a turn-to-lock arrangement.

Yet another object of this invention to provide a brewing filter apparatus in which a mesh cover and coffee container are made of plastic, preferably polyoxymethylene (POM), wherein a coarse filter is made of stainless steel; wherein a fine filter is made of nylon and wherein large and small O-rings are made of silicone rubber and wherein the brewing filter apparatus is designed to be used in conjunction with a general brew head assembly, such as found in a single-serve coffee machine.

Still yet another object of this invention to provide a brewing filter apparatus is to provide a foam maker with at least one small hole and preferably two small holes which directly oppose each other, each small hole having a diameter in the range of 0.3 to 1 mm., such that during brewing, a jet of beverage liquid races inward and turbulently contacts a stainless steel wire mesh inside the foam maker to increase the contact area and agitation of each jet and, as a result of the agitation and turbulence, and to form a layer of fine bubbles such as known as crema for coffee.

In accordance with one aspect of this invention a method of preparing foam, froth, or crema, comprises directing two opposing jets of brewed beverage at a pressure less than 15 bar along substantially diametrically opposed paths and situating a mesh between the opposing jets whereby the jets collide and produce the desired foam, froth or crema.

In accordance with another object of this invention, a brewing filter apparatus includes a beverage container, a filter affixed to the beverage container from above, a foam maker affixed to the beverage container from below and a seal intermediate the beverage container and the foam maker. The foam maker comprises a chamber, at least one hole therethrough for directing beverage into the chamber under pressure and a mesh spanning the chamber for intercepting the beverage passing through the at least one hole thereby to form the desired foam, froth or crema.

DESCRIPTION OF THE FIGURES

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DETAILED DESCRIPTION OF THE INVENTION

Figure 1:
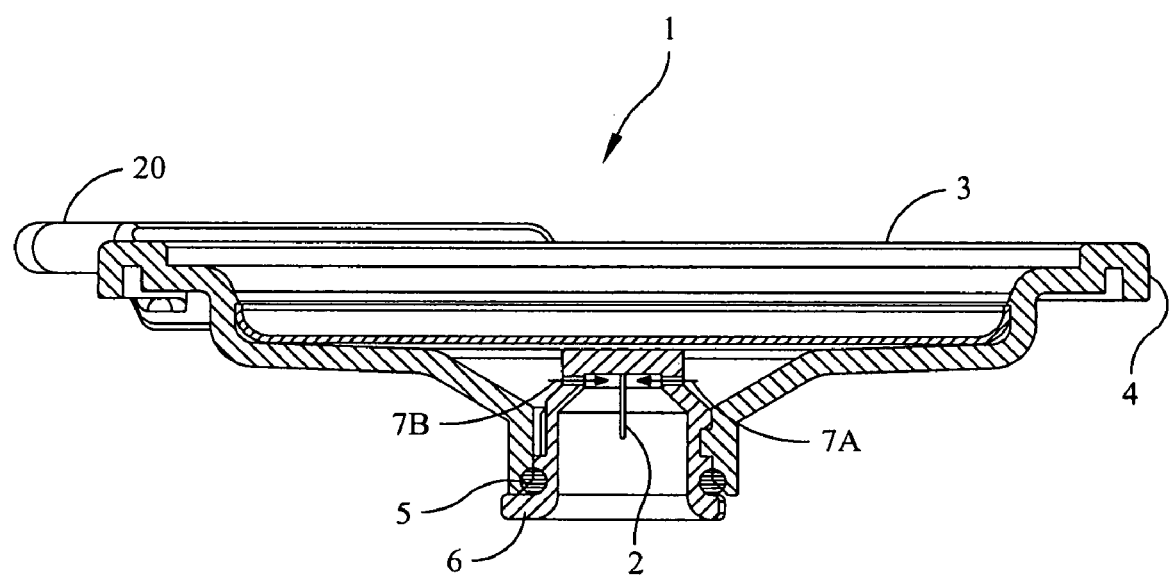
FIG. 1 is a cross-sectional illustration of one embodiment of a brewing filter apparatus with arrows showing the direction of the coffee flow/jet into the apparatus when preparing crema. In addition, a stainless steel wire mesh is situated in the center between the coffee jets.
Figure 2:
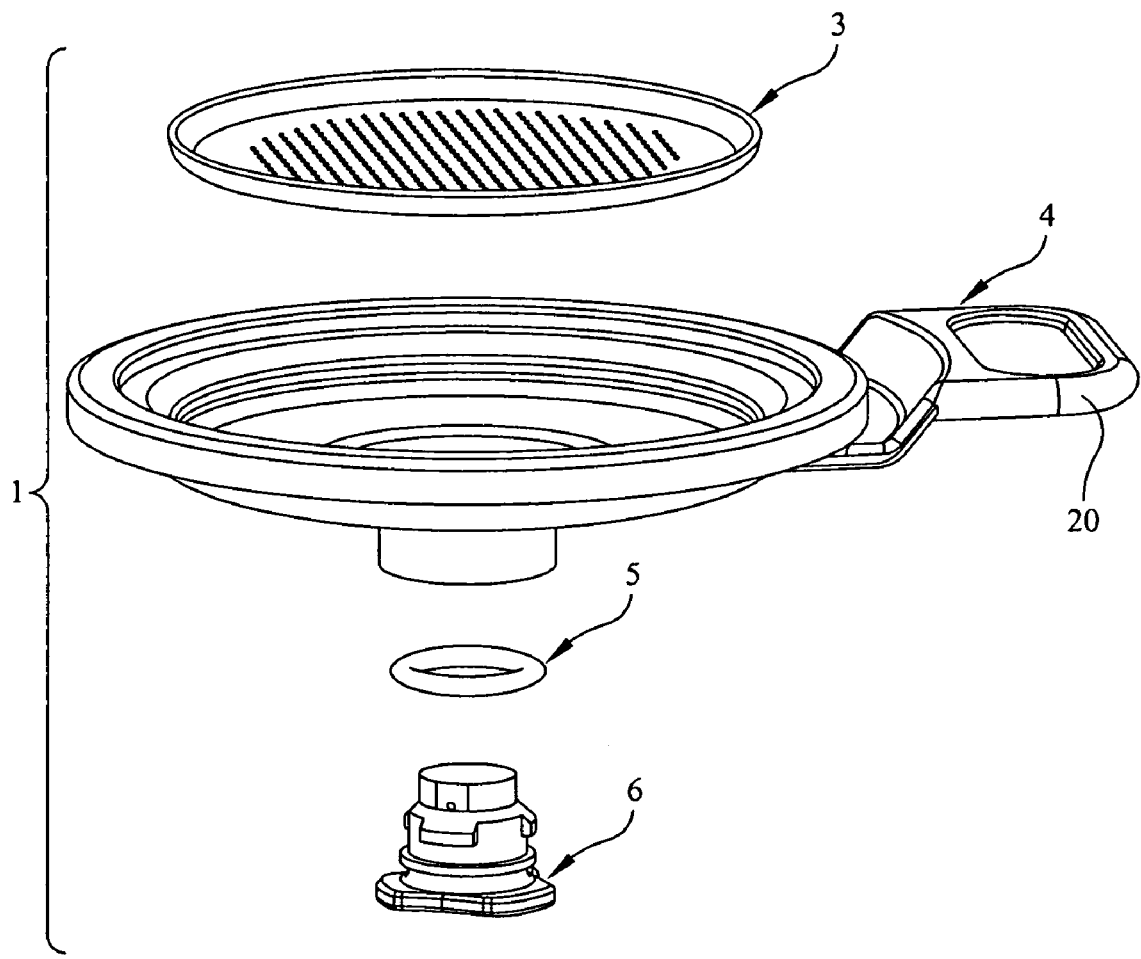
FIG. 2 is an exploded view of the brewing filter apparatus shown in FIG. 1.

Referring to FIGS. 1 and 2, the present invention pertains to a brewing filter apparatus 1 capable of preparing foam, froth, or crema, particularly for coffee and other beverages, under low pressure. While the current state of the art considers 15-19 bar pressure to be the optimum range for the formation of crema, the present invention is capable of preparing crema at pressures below 15 bar and as low as 1-3 bar.

The apparatus 1 of the present invention shown in FIGS. 1 and 2 comprises a filter 3, a coffee container 3, an O-ring 5 and a foam maker 6. The foam maker 6 is described later with respect to FIG. 5. In this embodiment, the filter is made of metal, such as stainless steel, and the O-ring is made of silicone rubber. These parts may be assembled together after individual molding or other appropriate methods of construction. The brewing filter apparatus 1 is designed to be used in conjunction with a coffee or other beverage-making machine.

The metal filter is affixed to the coffee container 4 from above and may be press-fit or attached to the coffee container 4 using appropriate methods, such as welding or brazing. The metal filter 3 separates the coffee grounds or coffee pod from the foam maker 6.

The operation of this apparatus 1 to brew coffee is relatively easy and straightforward. First, the user puts the proper amount of coffee grounds in the filter 3 which sits on top of the coffee container 4 of the apparatus 1. An optional mesh cover (not shown in FIGS. 1 and 2) may be placed on top of loose grounds to ensure that the grounds remain on the filter 3. If a coffee pod is used, a mesh cover is not necessary. In such an instance, the coffee pod can be placed directly in the coffee container 4. The brewing filter apparatus 1 then is placed on a coffee-making machine and secured. The present invention is now ready for brewing coffee with crema.

Figure 3:
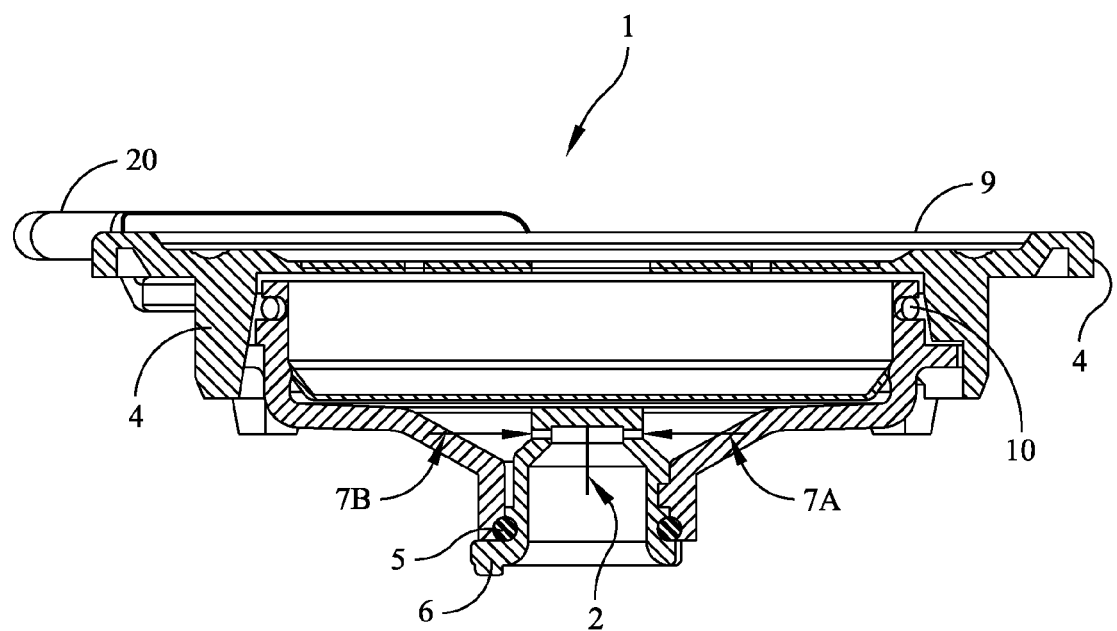
FIG. 3 is a cross-sectional illustration of a second embodiment of a brewing filter apparatus with arrows showing the direction of the coffee flow/jet into the apparatus when preparing crema.
Figure 4:
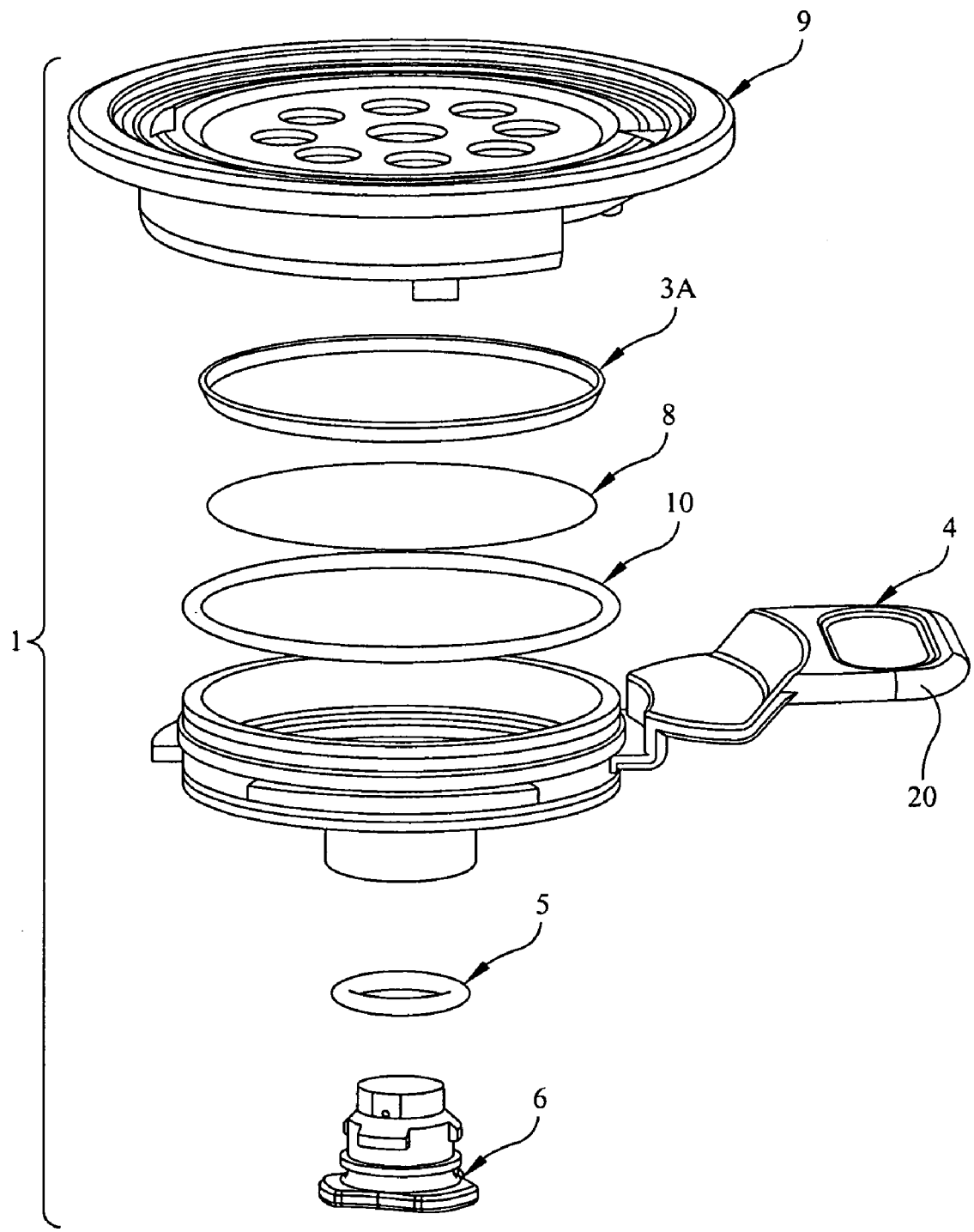
FIG. 4 is an exploded view of the brewing filter apparatus of FIG. 3.

The embodiment of the apparatus 1 in FIGS. 3 and 4 includes a mesh cover 9, a coarse filter 3A, a fine filter 8, a large O-ring 10, a coffee container 4, a small O-ring 5, and a foam maker 6. The coarse filter 3A, the coffee container 4, the small O-ring 5 and the foam maker 6 are structurally the same as the corresponding components in FIGS. 1 and 2. In a preferred embodiment, the mesh cover 9 is made of plastic, such as polyoxymethylene (POM); the coarse filter 3, of metal, such as stainless steel; the fine filter 8, of nylon; and the large and small O-rings, of an elastomer, such as silicone rubber.

The mesh cover 9 has a plurality of holes on its top surface and has a mesh, preferably a metal such as stainless steel, affixed to the underside of its top surface. Where the mesh cover 9 is made of plastic and the mesh is metal, the mesh cover 9 can be molded so as to secure the metal mesh to its underside. In another embodiment, plurality of holes on the top surface of the mesh cover 9 can be made of a sufficiently small size (but larger in number) so as to render it unnecessary to affix a mesh to its underside. The coarse filter 3 is not a mesh (in this particular embodiment) but instead more resembles a rigid sheet having a plurality of holes (about 300 in this particular embodiment) punched through its surface. The fine filter 8 is a mesh having about 80 to 140 eyes per cm2. These parts may be assembled together after individual molding or other appropriate method of construction. The brewing filter apparatus is designed to be used in conjunction with a coffee or beverage-making machine.

The mesh cover 9 is affixed to the coffee container 4 by a turn-to-lock arrangement, whereby the mesh cover 9 and coffee container 4 have corresponding threads/grooves such that a clockwise/counterclockwise turn will engage/release (or vice versa) the mesh cover. The coarse filter 3, fine filter 8, and large O-ring 10 are situated between the mesh cover 9 and coffee container 4 so as to keep the coffee grounds away from the foam maker 6, particularly when ground coffee as opposed to coffee pods are used in the machine.

The coffee container 4 of the brewing filter apparatus is 1 designed to be used in obtaining and/or measuring the required amount of coffee grounds or coffee pods needed for making the desired amount of brewed coffee. The coffee container 4 may be constructed of a suitable material that is FDA approved and capable of tolerating hot water temperatures of approximately 100 degrees Celsius. The material may be metal (e.g., stainless steel) or plastic (e.g., the previously described POM is a particularly suitable replacement) for metal due to its stiffness, dimensional stability, and corrosion resistance.

The coffee container 4 also has a handle 20 so that the user can hold the brewing filter apparatus. Preferably, the handle 20 should be constructed of a sturdy, insulating material so as to protect the user from the heat of the coffee container. To serve its intended purpose, the handle may be constructed of a suitable material such as polypropylene plastic. In a preferred embodiment, the entire coffee container 4 is made of plastic (e.g., polypropylene, POM) such that the handle and container are of one construction.

The operation of this embodiment of the apparatus 1 also is relatively easy and straightforward. The brewing filter apparatus may be adapted or modified for use on various single-serve coffee machines. In use, the user first puts the proper amount of coffee grounds onto the coarse filter 3A which is situated above the coffee container 4. The mesh cover 9 can be employed when using coffee grounds to retain the coffee grounds on the coarse filter 3A, but is optional when using coffee pods. The brewing filter apparatus 1 may then be inserted into a coffee-making machine and secured. The present invention is now ready for brewing coffee with crema. During operation, the crema coffee or other brewed beverage will then flow from the brewing filter apparatus to a pout on the coffee maker and then to the user's cup.

The function of the foam maker 6 is to facilitate and enhance the formation of crema during the brewing process. The foam maker 6 is affixed to the coffee container 4 from below by a screw fit, whereby the exterior of said foam maker comprises threads and said coffee container comprises an orifice with corresponding grooves for receiving said threads. The foam maker 6 may also be affixed to the coffee container 4 by spot welding or by a bayonet fitting. When assembled, the foam maker 6 is inserted into the larger hollow cavity on the underside of the coffee container 4 whereby the exterior of said coffee maker comprises an orifice and the exterior of said foam maker comprises a recess to receive said orifice.

The foam maker 6 may be constructed of a suitable material such as plastic, metal, or a combination thereof. In one embodiment, the plastic is polypropylene and the metal is stainless steel. In a preferred embodiment, the plastic is glass-filled nylon and the metal is brass. The small O-ring 5 is placed between the foam maker 6 and the coffee container 4 so as to form a water- and air-tight seal.

Figure 5:
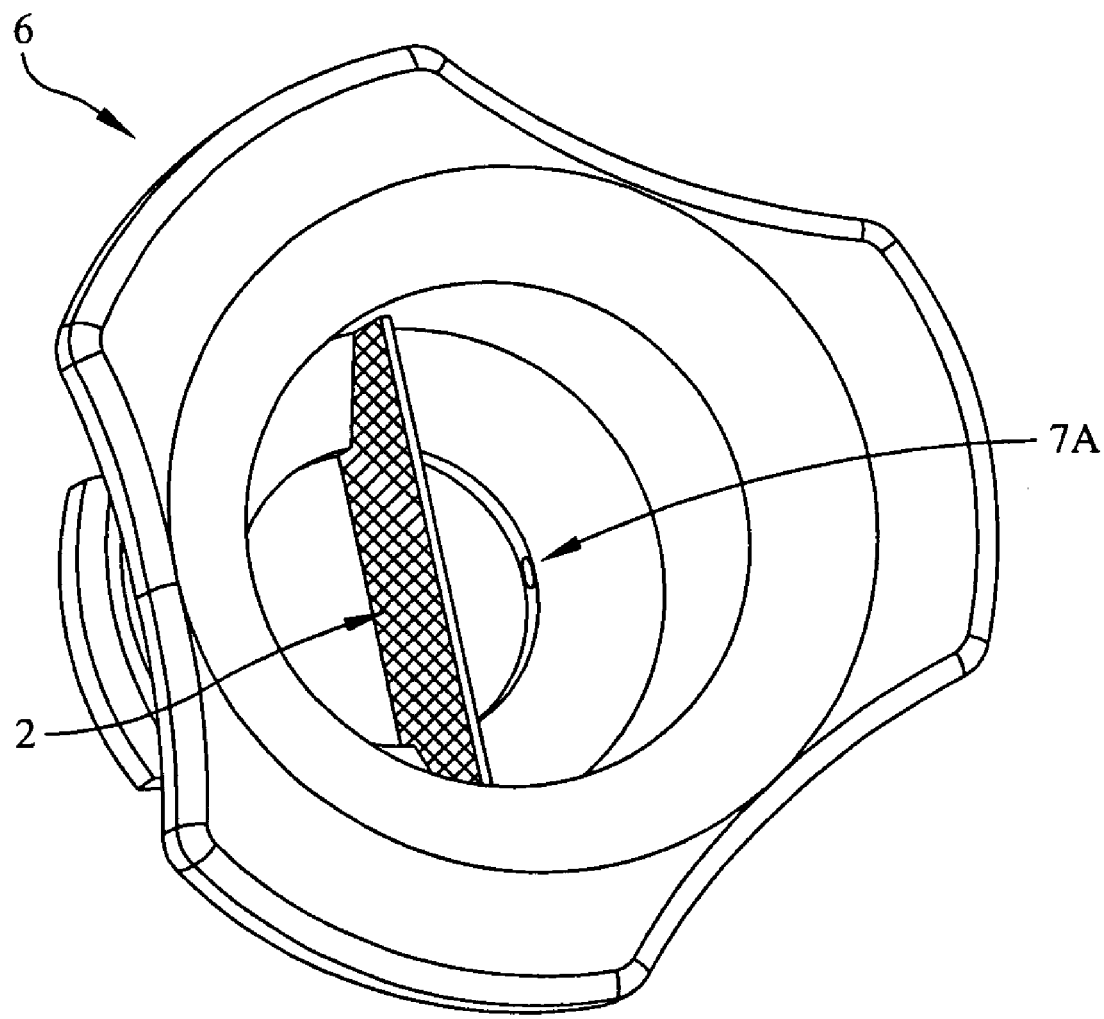
FIG. 5 is an isometric view of the foam maker showing one of two opposing holes for the coffee jets and a stainless steel wire mesh situated in the center, separating the two opposing holes.

In a preferred embodiment and as shown in FIGS. 1 and amended FIG. 3, the foam maker 6 has two opposing holes 7A and 7B extending from its exterior to its interior. The size of the holes ranges from 0.3 to 1 mm in diameter. During operation, the holes allow a horizontal jet of coffee to race into the interior of the foam maker, thereby turbulently contacting the other opposing jet of coffee and creating foam, froth, or crema. To facilitate agitation of the coffee and thus the formation of crema, a mesh 2, preferably made of stainless steel wire in a planar shape as shown in FIG. 5, is situated in the center of the foam maker 6 directly in the path of and in between the opposing jets of coffee. Preferably, the mesh has in the range of 50 to 100 eyes per cm2. The mesh provides a larger surface area for the contacting of the opposing coffee jets, resulting in greater turbulence of the coffee and the formation of more crema.

Although, the preferred embodiment of the present invention is directed to making crema coffee, it should be understood that the brewing filter apparatus can be used to brew beverages and concoctions including, but not limited to, tea, liquid extracts, and the like. Moreover, this invention has been disclosed in terms of certain embodiments. It will be apparent that many modifications can be made to the disclosed apparatus without departing from the invention. For example, the various components have been disclosed with specific configurations that can be varied. Two particularly advantageous structures are disclosed. However, other structures could be substituted that perform essentially the same function with some or all of the benefits of the disclosed structures. Various other implementations could be substituted that provide some or all the advantages of the specifically disclosed brewing filter apparatus.

What is claimed is:

1. A method of preparing foam, froth, or crema, in a brewing filter apparatus comprising directing two opposing jets of brewed beverage at a pressure less than 15 bar from substantially opposite directions thereby to contact each other in a turbulent manner and situating a mesh between the opposing jets at the point of contact whereby a foam, froth or crema is produced.

2. The method of claim 1 wherein each of the opposing jets is directed at a pressure in the range of 1-3 bar.

3. A brewing filter apparatus including a beverage container, a filter affixed to the beverage container from above, a foam maker affixed to the beverage container from below and a seal intermediate the beverage container and the foam maker, the foam maker comprising a chamber and two holes extending from the exterior to the interior at the chamber for directing beverage into the chamber under pressure in opposite directions and a planar mesh spanning the chamber and facing said two holes thereby to intercept the beverage passing through said two holes and form a beverage foam.

4. The brewing filter apparatus as recited in claim 3 wherein the diameter of each hole in the foam maker ranges from 0.3 to 1 mm.

5. The brewing filter apparatus as recited in claim 3 wherein the mesh includes a plurality of eyes therethrough with a density in the range of 50 to 100 eyes per $cm^2$.

6. The brewing filter apparatus as recited in claim 3 wherein the mesh is made of stainless steel.

7. The brewing filter apparatus as recited in claim 3 wherein the foam maker is made of brass or stainless steel.

8. The brewing filter apparatus as recited in claim 7 wherein the metal is brass.

9. The brewing filter apparatus as recited in claim 3 wherein the form maker is made of polypropylene or glass-filled nylon.

10. The brewing filter apparatus as recited in claim 3 wherein the foam maker is affixed to the beverage container by spot welding or by a bayonet fit whereby the exterior of said foam maker comprises an orifice and the exterior of said foam maker comprises a recess for receiving said orifice.

11. The brewing filter apparatus as recited in claim 3 wherein the foam maker is affixed to the beverage container by a screw fit whereby the exterior of said foam maker comprises threads and the exterior of said beverage container comprises an orifice with corresponding grooves for receiving said threads.

12. The brewing filter apparatus as recited in claim 3 wherein the filter is affixed to the beverage container by press fitting, welding, or brazing.

13. The brewing filter apparatus as recited in claim 12 wherein the filter is made of stainless steel.

14. The brewing filter apparatus as recited in claim 3 wherein the seal comprises an O-ring.

15. The brewing filter apparatus as recited in claim 14 wherein the O-ring is made of an elastomer.

16. The brewing filter apparatus as recited in claim 15 wherein the elastomer is made of silicone rubber.

17. The brewing filter apparatus as recited in claim 3 wherein the filter is a fine filter and the apparatus additionally includes a coarse filter, a mesh cover and a second O-ring wherein the mesh cover, the coarse filter, the fine filter and the second O-ring are affixed to said beverage container from above.

18. The brewing filter apparatus of claim 17 wherein the mesh cover is affixed to the beverage container by a turn-to-lock arrangement.

19. The brewing filter apparatus of claim 17 wherein the coarse filter is made of a suitable metal.

20. The brewing filter apparatus of claim 19 wherein the metal is stainless steel.

21. The brewing filter apparatus of claim 17 wherein the beverage container is made of suitable plastic.

22. The brewing filter apparatus of claim 17 wherein the first and second O-rings are made of an elastomer.

23. The brewing filter apparatus of claim 22 wherein the elastomer is silicone rubber.

* * * * *